United States Patent
Nakamura (10) Patent No.: US 8,174,613 B2
(45) Date of Patent: May 8, 2012

(54) SUBSTRATE MOUNTING STRUCTURE FOR A CAMERA DEVICE

(75) Inventor: Akihiro Nakamura, Saitama (JP)

(73) Assignee: Sony Corporation, Tokyo (JP)

( * ) Notice: Subject to any disclaimer, the term of this patent is extended or adjusted under 35 U.S.C. 154(b) by 331 days.

(21) Appl. No.: 12/468,481

(22) Filed: May 19, 2009

(65) Prior Publication Data

US 2009/0295985 A1    Dec. 3, 2009

(30) Foreign Application Priority Data

May 30, 2008    (JP) .................................. 2008-143274

(51) Int. Cl.
*H04N 5/225* (2006.01)
(52) U.S. Cl. ........................................... 348/374
(58) Field of Classification Search .................. 348/373, 348/374, 340; 257/433, 434; 250/239
See application file for complete search history.

(56) References Cited

U.S. PATENT DOCUMENTS

| | | | |
|---|---|---|---|
| 5,883,386 A * | 3/1999 | Tsuyuki et al. ............... | 257/433 |
| 6,122,009 A | 9/2000 | Ueda | |
| 7,059,040 B1 | 6/2006 | Webster et al. | |
| 7,988,371 B2 * | 8/2011 | Aoki et al. ..................... | 348/340 |
| 2007/0029466 A1 * | 2/2007 | Chang et al. ................ | 250/208.1 |
| 2007/0120213 A1 * | 5/2007 | Hiew et al. ..................... | 257/433 |

FOREIGN PATENT DOCUMENTS

| | | |
|---|---|---|
| JP | 2006-219512 A | 8/2006 |
| JP | 2007-4068 | 1/2007 |
| JP | 2007-4068 A | 1/2007 |
| JP | 2007-150708 A | 6/2007 |
| JP | 2007-225991 | 9/2007 |
| WO | WO 2004/010687 A1 | 1/2004 |
| WO | WO 2004/027880 A2 | 4/2004 |

OTHER PUBLICATIONS

Office Action issued Jul. 20, 2011 in European Application No. 09 161 385.1-1241.

* cited by examiner

*Primary Examiner* — Jason Whipkey
(74) *Attorney, Agent, or Firm* — Oblon, Spivak, McClelland, Maier & Neustadt, L.L.P.

(57) ABSTRACT

The present invention provides a camera device including: an image pickup element; a substrate mounted with the image pickup element thereon; and a housing accommodating the image pickup element therein. The housing is provided with a plurality of support members which extend upright and to which an external edge portion of the substrate is stuck with an adhesive. The substrate is provided with an application area to which the adhesive is applied, at the external edge portion stuck with the support members.

3 Claims, 8 Drawing Sheets

SUBSTRATE MOUNTING STRUCTURE FOR A CAMERA DEVICE

BACKGROUND OF THE INVENTION

1. Field of the Invention

The present invention relates generally to camera devices and, in particular, to a camera device suitable to be used as an on-board camera attached to a vehicle to improve the convenience and safety thereof.

2. Description of the Related Art

In order to improve the convenience and safety of an automobile, a camera device has been provide that is mounted on a vehicle body to visually recognize the periphery thereof by use of a monitor installed near a cockpit. The camera devices of this type have a generally rectangular housing in which an image pickup lens and an image pickup element are incorporated. This housing is built in or mounted on a rear door, a side mirror, a front spoiler or the like of the vehicle body so as to allow the image pickup lens to face the outside. The camera device as mentioned above can view the periphery of the vehicle body as a driver's blind spot to improve safety and convenience.

Incidentally, it is often difficult for the camera device of this type to blend in with the exterior design of an automobile. In addition, it is desirable for the camera device to be exteriorly inconspicuous as much as possible. It is not preferable in preventing damage or in preventing the image pickup lens from getting dirt that the housing is significantly exposed to the exterior. This is because a risk increases in which the housing comes into contact with the outside during vehicle wash, during opening or closing of a door, during traveling or during parking. Thus, the camera device is desired to be further downsized.

A camera device used as an on-board camera is formed generally rectangular and includes a housing in which an image pickup lens is incorporated; and a substrate on which an image pickup element such as a CCD (Charge Coupled Devise) is mounted. In addition, the camera device is formed such that the substrate is secured to the inside of the housing in such a manner that the image pickup element is opposed to the image pickup lens. The housing is composed of upper and lower halves. The substrate is secured to inside of one of the halves and then the one half is joined to the other. The securing of the substrate to the one half is performed using an adhesive or screws.

The securing of the substrate to the one of halves is needed to provide significant strength to hold the respective positions of the image pickup lens and the image pickup element. In particular, the camera device used as an on-board camera needs resistance to shocks during opening and closing of a door and during traveling. However, if securing is performed using an adhesive, it is necessary to ensure an adhesive application area over the full periphery of the substrate, i.e., along the external edge thereof. This necessity leads to the increased size of the substrate taking into account the mount area of the image pickup element, etc. In a case of screwing the substrate to the one half, if a plurality of screw insertion areas are provided, the substrate is similarly increased in size. The increased size of the substrate will undesirably increase the size of the housing. See Japanese Patent Laid-open No. 2007-225991.

SUMMARY OF THE INVENTION

It is desirable, therefore, to provide a camera device that can reduce the overall size thereof while ensuring the adhesive strength between a substrate and a housing.

According to an embodiment of the present invention, there is provided a camera device including: an image pickup element; a substrate mounted with the image pickup element thereon; and a housing accommodating the image pickup element therein; wherein the housing is provided with a plurality of support members which extend upright and to which an external edge portion of the substrate is stuck with an adhesive; and wherein the substrate is provided with an application area to which the adhesive is applied, at the external edge portion stuck with the support members.

According to the embodiment of the present invention, since the application area to which the adhesive is applied is provided along the lateral edge portion of the substrate, an area in which a component part cannot be mounted can effectively be utilized. Thus, the substrate can be downsized while ensuring a wide mount area for the image pickup element. In addition, the camera device according to the embodiment of the invention is such that the housing can be downsized along with the downsizing of the substrate.

DETAILED DESCRIPTION OF THE PREFERRED EMBODIMENT

A camera device according to an embodiment of the present invention will hereinafter be described in detail with reference to the drawings.

Figure 1:
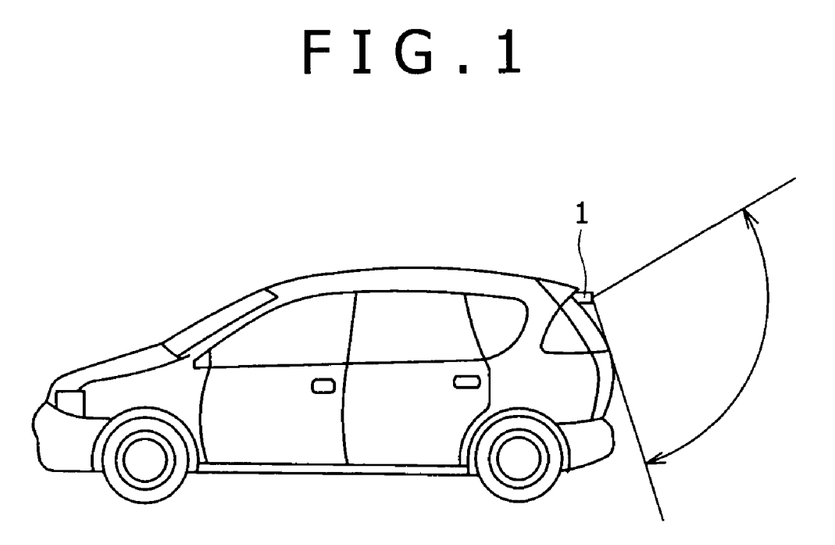
FIG. 1 is a lateral view of an automobile on which a camera device according to an embodiment used as an on-board camera is mounted.
Figure 2:
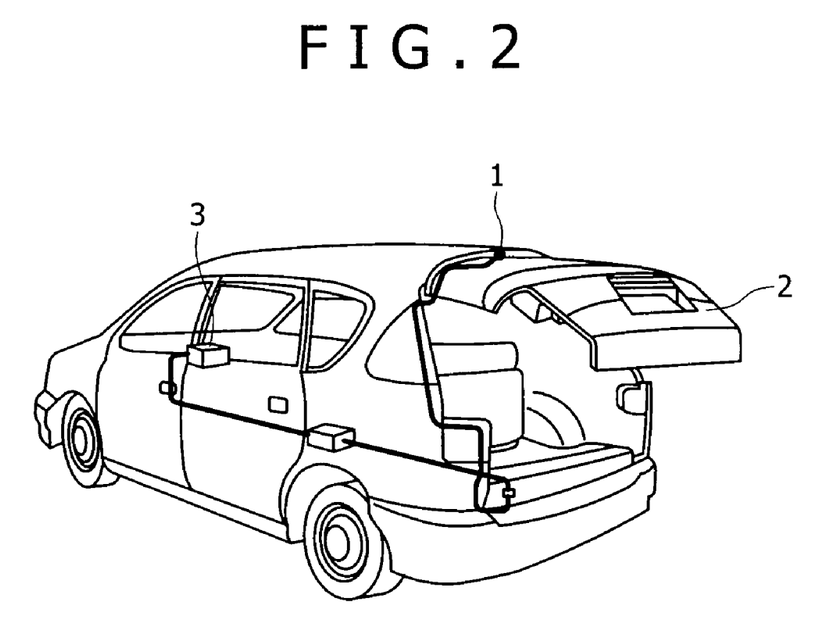
FIG. 2 is a perspective view of the automobile on which the camera device according to the embodiment used as an on-board camera is mounted.

Referring to FIG. 1, a camera device 1 of the embodiment is installed on a rear portion of a vehicle body of an automobile so as to be used as a rear monitor for reflecting the rearward of the vehicle body. As illustrated in FIG. 2, the camera device 1 is attached to the general center of a back door 2 and connected to a navigation system 3 and allows a monitor disposed on a dashboard or instrumental panel on a driver's seat side to show a rearward image.

Figure 3:
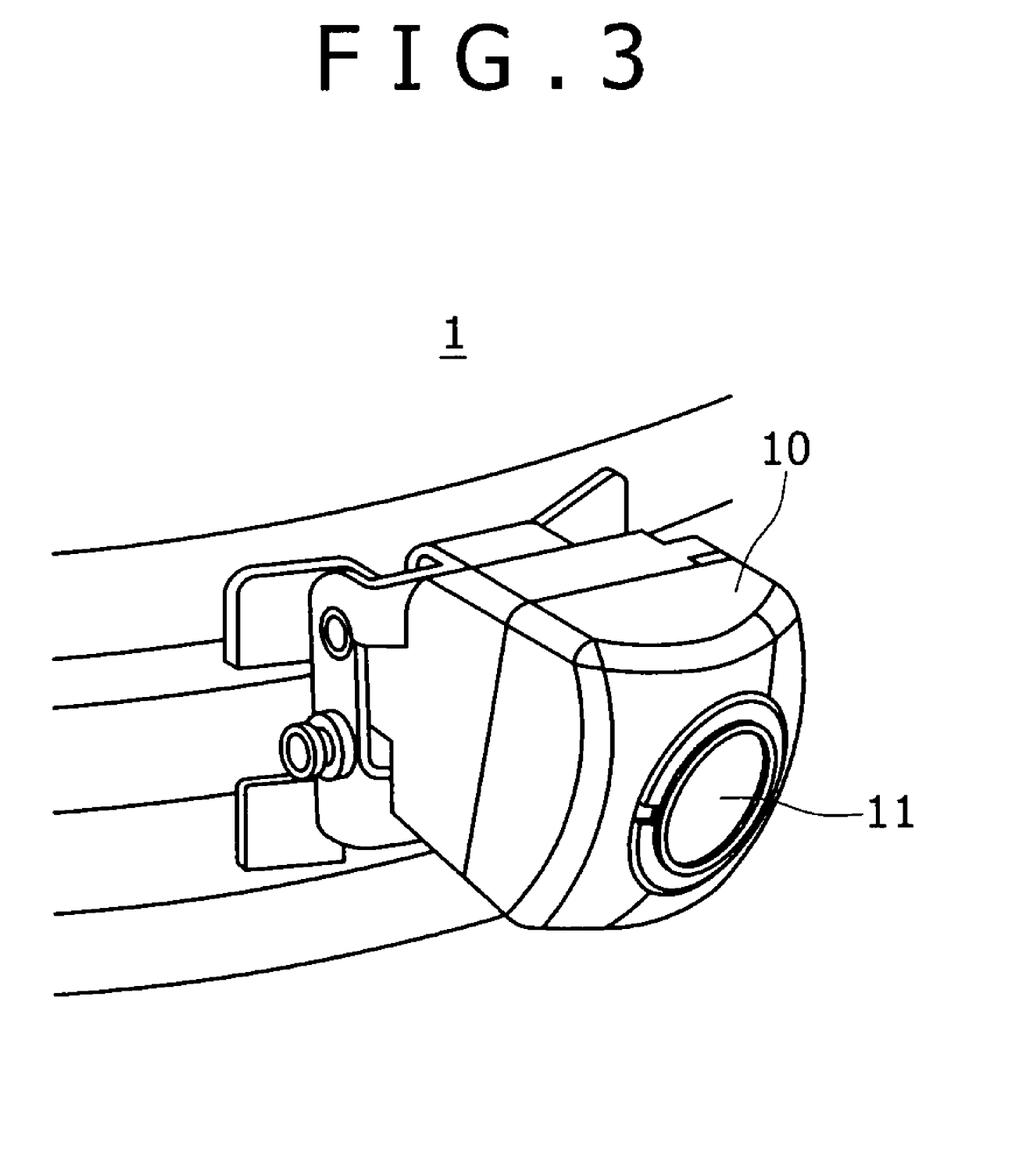
FIG. 3 is a perspective view of the camera device according to the embodiment.
Figure 4:
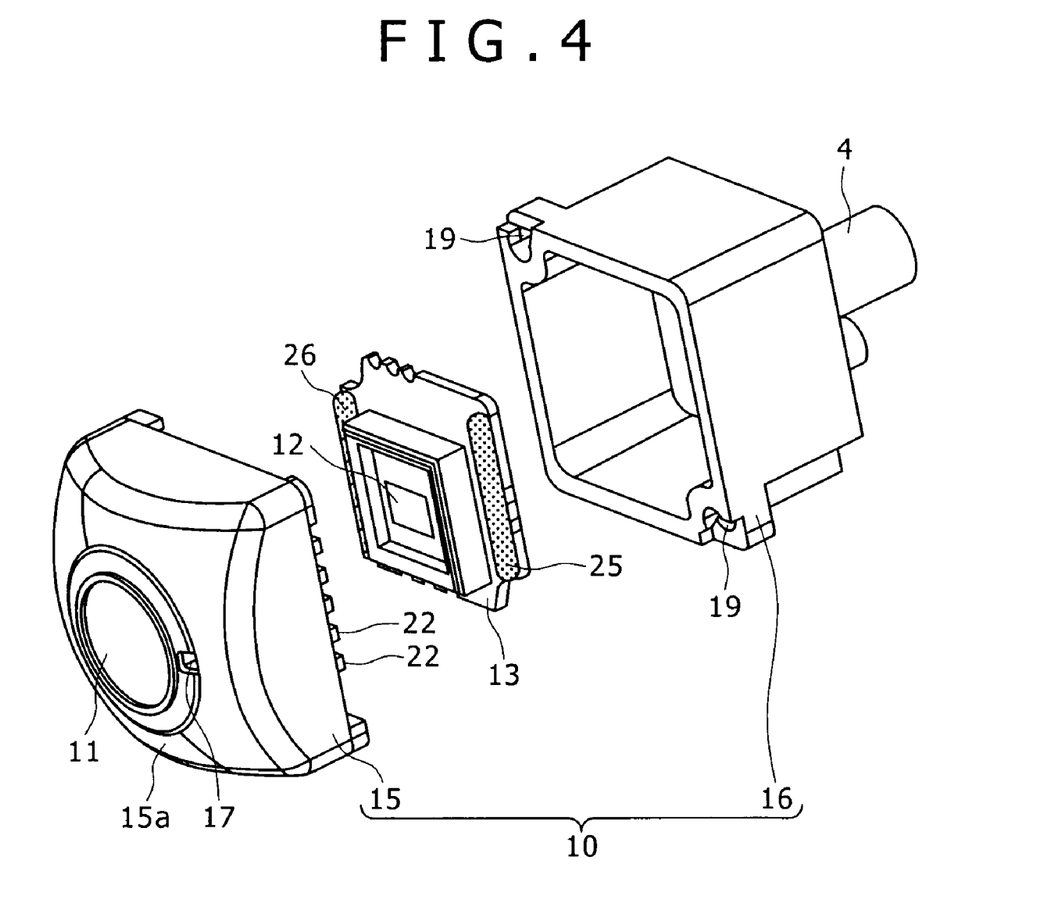
FIG. 4 is an exploded perspective view of the camera device according to the embodiment as viewed from the front side thereof.
Figure 5:
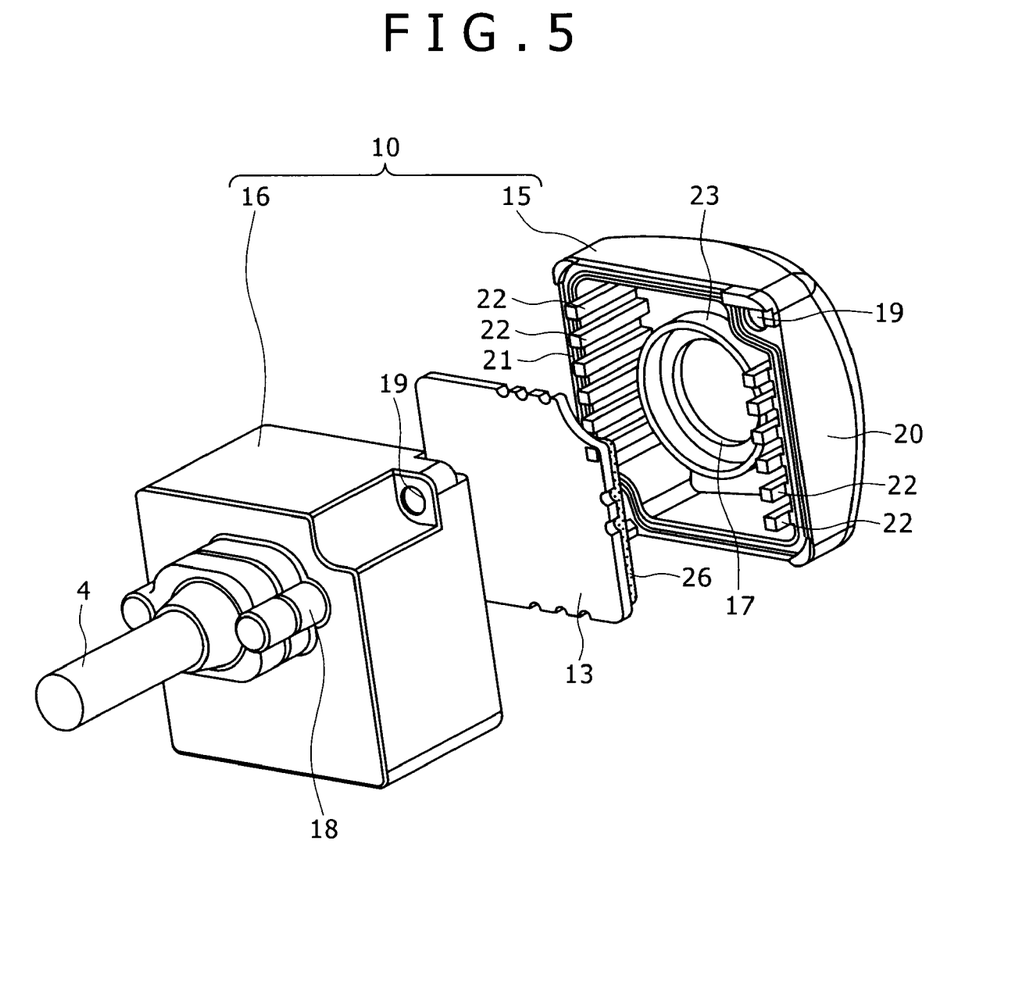
FIG. 5 is an exploded perspective view of the camera device according to the embodiment as viewed from the rear side thereof.

Referring to FIGS. 3 through 5, the camera device 1 includes a generally rectangular housing 10; an image pickup lens 11 assembled in the housing 10; an image pickup element 12 such as a CCD, CMOS (Complementary Metal Oxide Semiconductor), etc., for capturing an image directed thereto via the image pickup element 12; and a substrate 13 mounted with the image pickup lens 12 and secured to the inside of the housing 10.

The housing 10 is formed by abutment-joining together a pair of upper and lower halves 15, 16. The upper and lower halves 15, 16 are molded into a generally rectangle shape using engineering plastic or the like. The upper half 15 is formed with a circular lens aperture portion 17 at the general center of a main surface 15a, into which the image pickup lens 11 is fitted. The lower half 16 is formed with a jack portion 18 having a lower surface to which a connector cable 4 is screwed. The upper and lower halves 15, 16 are formed with screw holes 19 at respective corner portions opposed to each other. They are abutted against each other so that the corresponding screw holes 19 are aligned with each other. Screws are inserted into the screw holes 19 so that the upper and lower halves 15, 16 are joined together.

Referring to FIG. 5, a plurality of pillars 22 are integrally provided on the internal surface of the upper half 15 to rise therefrom along a pair of opposite lateral walls 20, 21 and are used to secure the substrate 13. For example, six of the pillars 22 are provided at generally equal intervals for each of the lateral walls 20, 21. The pillars 22 are formed to have the same height and each of them has a generally flat upper surface. The pillars 22 as mentioned above are stuck to adhesive application areas 25, 26 provided at a pair of respective opposite lateral edges of the substrate 13 described later.

Figure 6:
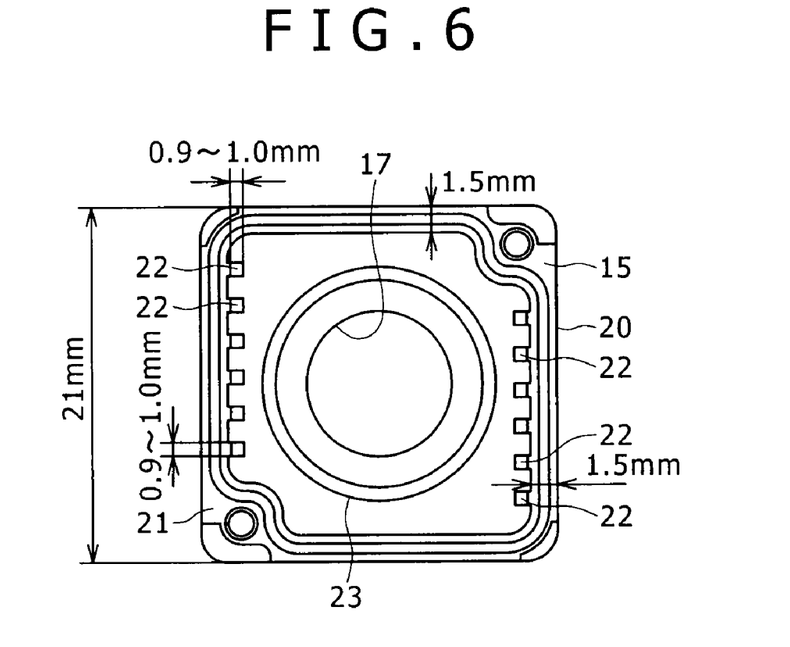
FIG. 6 is a rear view of an upper half of the camera device with its sizes exemplified.

Referring to FIG. 6, the upper half 15 as described above is formed as a square, e.g., 21 mm on a side. In addition, four lateral walls including the lateral walls 20, 21 each have a thickness of about 1.5 mm. The pillars 22 are each formed as a rectangular parallelepiped having a square upper surface 0.9 to 1.0 mm on a side. As described above, the upper half 15 is such that the width (0.9 to 1.0 mm) of the pillar 22 is about 60% of the thickness (1.5 mm) of the lateral wall 20, 21. Therefore, the lateral walls 20, 21 can be prevented from causing shrinkage during molding. Specifically, if a rising wall is formed adjacently to and parallel to each of the lateral walls 20, 21, then the lateral walls 20, 21 cause a thick portion, so that shrinkage is likely to occur during molding. On this point, the camera device 1 according to the embodiment of the invention is such that the plurality of pillars 22 are juxtaposed to each other along each of the lateral walls 20, 21. Therefore, the lateral walls 20, 21 can be prevented from causing the shrinkage.

Figure 7:
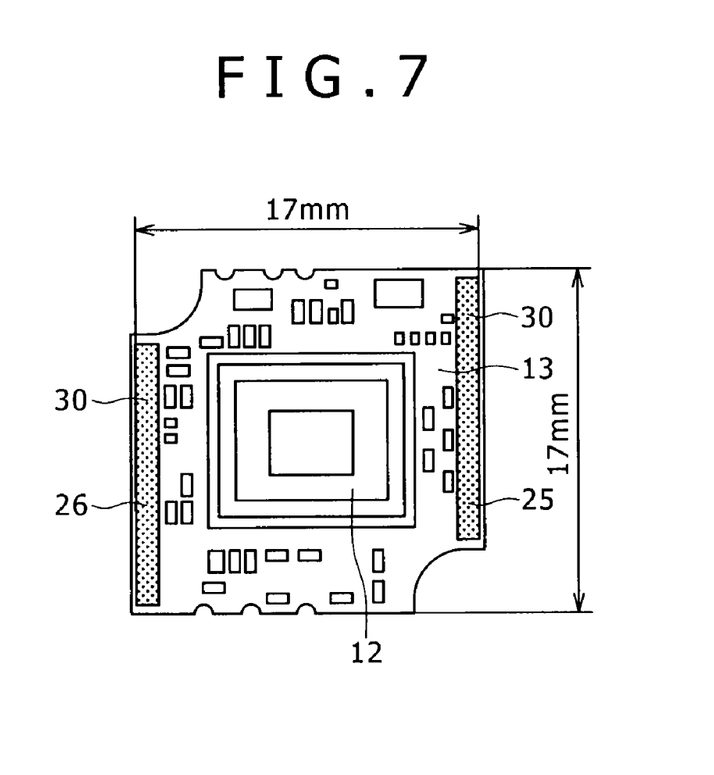
FIG. 7 is a plan view illustrating a front surface of a substrate.

A description is next given of the substrate 13 secured to the pillars 22. As illustrated in FIG. 7, the substrate 13 is a rigid substrate formed in a rectangle about 17 mm on a side. The image pickup element 12 such as a CCD, CMOS or the like is mounted on the front surface of the substrate 13 and connectors to which harnesses provided with cables for signals and a power supply are connected are mounted on the rear surface thereof. The substrate 13 is stuck to the pillars 22 such that the image pickup element 12 faces the inside of the upper half 15 so as to be opposed to the image pickup lens 11 fitted to the upper surface 15.

The substrate 13 is provided at opposite substrate lateral edge portions with the pair of left and right application areas 25, 26 corresponding to the pair of respective pillars 22 provided to rise therefrom along the lateral walls of the upper half 15. An adhesive 30 is applied to the application areas 25, 26. The application areas 25, 26 are provided along the associated lateral edge portions of the substrate 13 to which component parts cannot be mounted. In this way, the substrate 13 can be provided with the application areas 25, 26 making effective use of limited spaces while ensuring the mounting area of the image pickup element 12. Thus, the substrate can be prevented from being increased in size.

The substrate 13 formed with a predetermined wiring pattern and mounted with the image pickup element 12 thereon is such that the adhesive 30 is applied to the application areas 25, 26 and the upper surfaces of the pillars 22 provided on the upper half 15 to rise therefrom are placed on the application areas 25, 26. For example, an ultraviolet curable adhesive can be uses as the adhesive 30 applied to the application areas 25, 26.

After the adhesive 30 is applied to the substrate 13, the pillars 22 are placed on the application areas 25, 26. Positioning is performed between the image pickup lens 11 fitted to the upper half 15 and the image pickup element 12 mounted on the front surface of the substrate 13. Then, the adhesive 30 is cured by ultraviolet irradiation or the like so that the substrate 13 is stuck to the pillars 22. After the substrate 13 has been stuck to the pillars 22, the upper half 16 is joined to the lower half 16 to form the housing 10.

Figure 8:
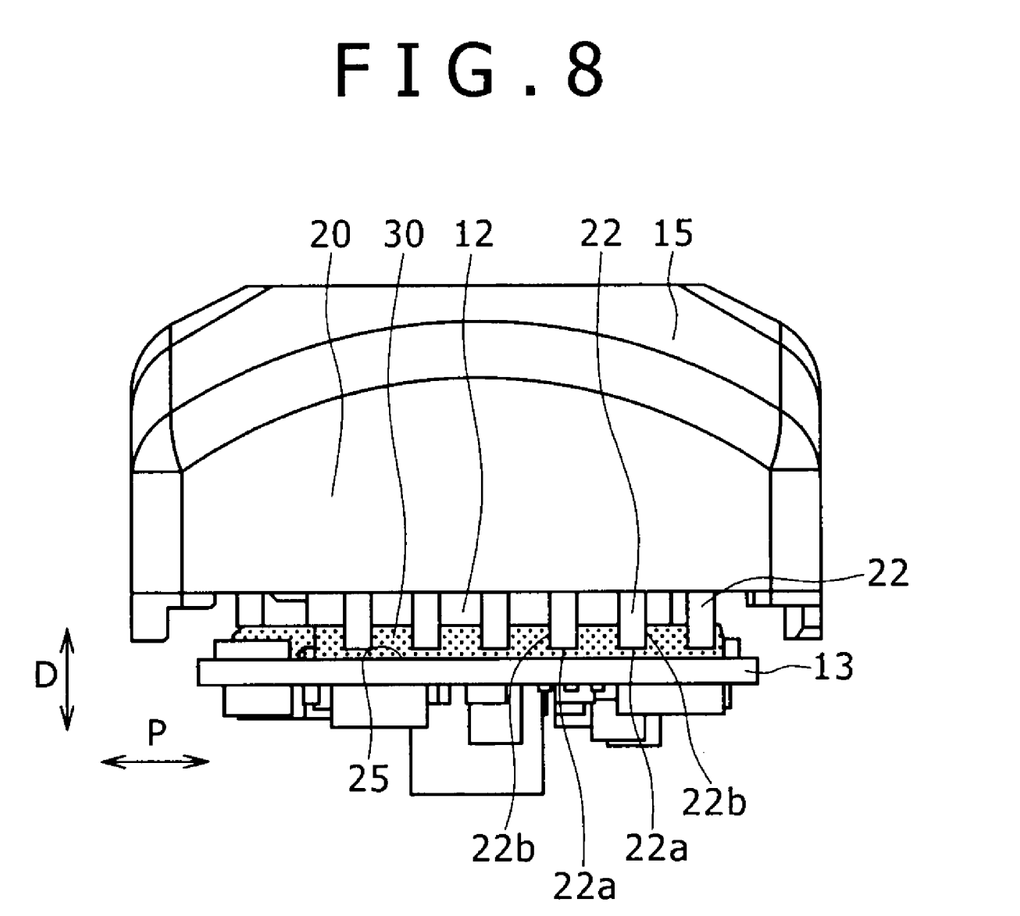
FIG. 8 is a lateral view illustrating the upper half to which the substrate is stuck.

In this case, the adhesive 30 applied to the application areas 25, 26 of the substrate 13 runs into between the pillars 22 to fill also on the upper surfaces 22a and lateral surfaces 22b of the pillars 22 as illustrated in FIG. 8. In this way, the substrate 13 and the pillars 22 have strength not only against a peeling direction indicated with arrow P but against a drawing-out direction indicated with arrow D. Thus, the substrate 13 and the pillars 22 have an adhesive strength equal to or greater than the case where an adhesive application area is fully formed over the periphery of the substrate 13.

Incidentally, since the pillars 22 are provided to rise from the upper half 15, the camera device 1 is suitable to allow the pillars 22 to be abutted against the application areas 25, 26 of the adhesive 30 and to allow ultraviolet to be directed thereto.

According to the camera device 1 as described above, the pair of application areas 25, 26 to which the adhesive 30 is applied are provided along the opposite lateral edge portions of the substrate 13. Therefore, the area in which a component part cannot be mounted can effectively be utilized. Thus, the substrate 13 can be downsized while ensuring the mounting area for the image pickup element 12. In addition, the camera device 1 is such that the downsizing of the substrate 13 can reduce the size of the housing 10.

Figure 9A:
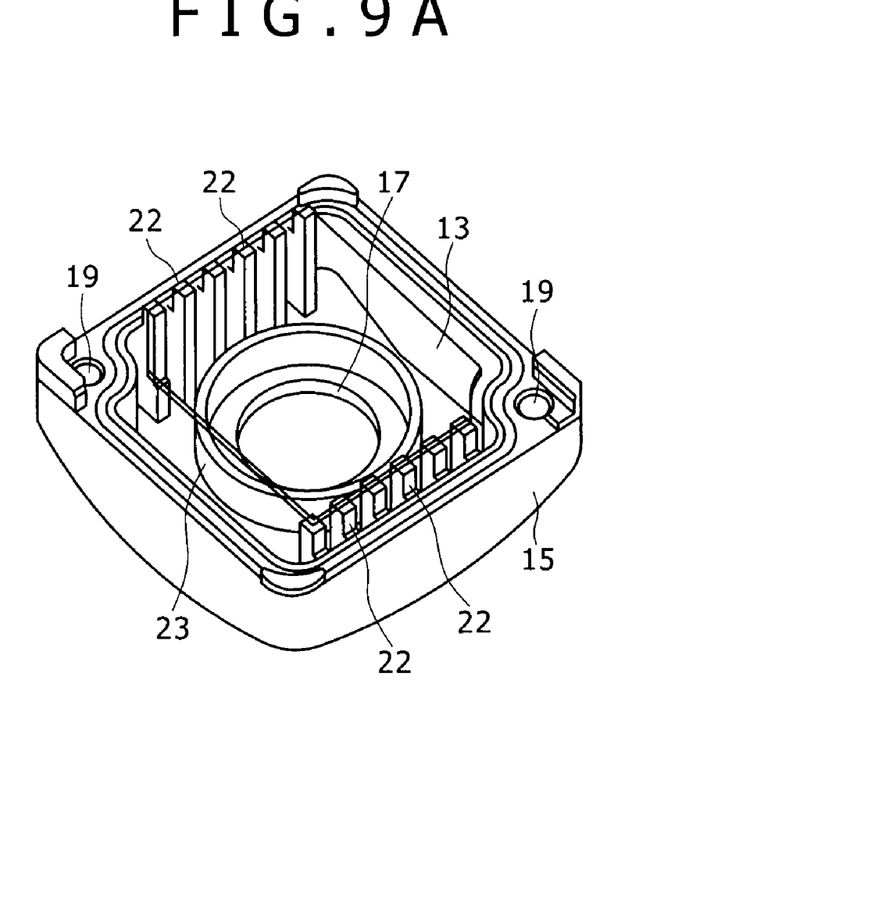
FIG. 9A is a perspective view of an upper half stuck with the substrate by way of another example as viewed through the substrate.
Figure 9B:
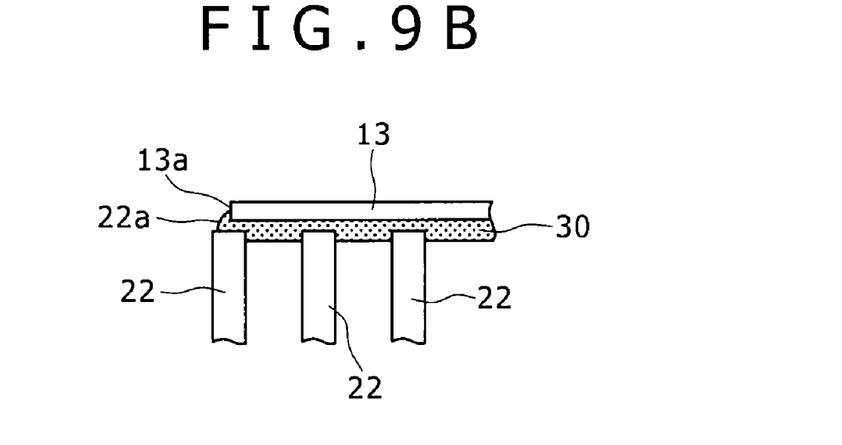
FIG. 9B is a lateral view of the upper half.

Referring to FIG. 9A, the camera device 1 according to the embodiment of the present invention may be formed such that a pair of external edges of the substrate 13 provided with the application areas 25, 26 are located inside of the upper surface of each pillar 22 and placed to get across the upper surfaces of the pillars 22. Since the pair of external edges of the substrate 13 are placed to get across the upper surfaces of the pillars 22, the adhesive 30 applied to the application areas 25, 26 is applied from the upper surface 22a of the pillar 22 to a lateral surface 13a of the substrate 13 as illustrated in FIG. 9B. Thus, the application area where the adhesive 30 is applied to between the substrate 13 and the pillars 22 is increased to increase the adhesive strength due to the adhesive 30. The lateral surface 13a to which the adhesive 30 is applied is made rough-surfaced by being cut into a predetermined shape. Therefore, the adhesive strength between the substrate 13 and pillars 22 due to the adhesive 30 is increased by applying the adhesive 30 to the lateral surfaces 13a.

Figure 10:
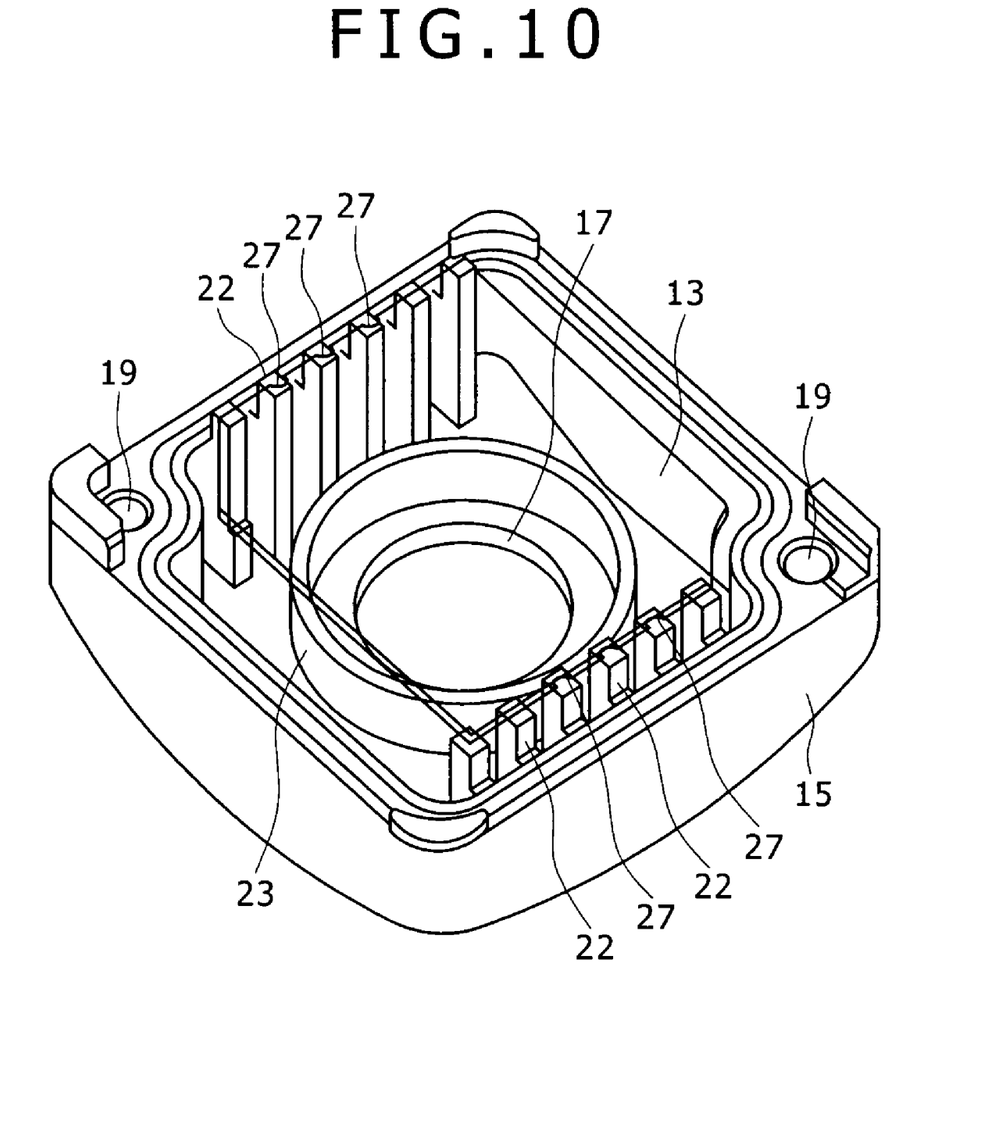
FIG. 10 is a perspective view of an upper half stuck with the substrate by way another example as viewed through the substrate.

Referring to FIG. 10, in the camera device 1, circular recessed portions 27 may be formed at lateral edge portions of the substrate 13 formed with the application areas 25, 26. A plurality of the recessed portions 27 are formed at intervals depending on the adhering positions to the pillars 22. The substrate 13 is placed, i.e., located on the upper surfaces 22a of the pillars 22. In this way, the substrate 13 may be such that the adhesive applied to the application areas 25, 26 is filled from the upper surfaces 22a of the pillars 22 to the recessed portions 27. The recessed portions 27 are formed by a method of forming drill-holes at predetermined positions of a workpiece formed with a plurality of the substrates 13 and then cutting the workpiece to divide each of the drill-holes. In addition, the lateral surface 13a of the substrate 13 forming the recessed portion 27 is rough-surfaced as described above. In this way, the substrate 13 is increased in the application area of the adhesive 30 by applying the adhesive to the recessed portions 27. In addition, the adhesive strength between the pillars 22 and the substrate 13 can be increased by applying the adhesive also to the rough-surfaced lateral surfaces 13a.

Incidentally, although the housing 10 of the camera device 1 is formed in a generally rectangular shape, it may be formed, for instance, in a cylindrical shape. In this case, also the substrate 13 is formed disklike so as to correspond to the shape of the housing. Also the pillars 22 supporting the lateral edge portion of the substrate 13 are provided to extend upright and be circularly juxtaposed to each other. Although the pillars 22 of the camera device 1 are provided to extend upright at regular intervals, they may be provided to extend upright at irregular intervals.

Further, the height of the pillars 22 can be determined based on various factors such as the shape of the substrate 13, and the orientation, shape and arrangement of the image pickup element 12. It is not always have to form the pillars 22 to have the same height.

The pillars 22 may be such that rough-surfacing processing may be given to the upper surfaces 22a abutted against the application areas 25, 26 of the adhesive 30 and to the lateral surfaces 22b stuck with the adhesive 30. The pillars 22 can be increased in adhesive strength by rough-surfacing the upper surfaces 22a and lateral surfaces 22b stuck with adhesive.

Further, the pillars 22 may be formed such that the upper surfaces 22a abutted against the application areas 25, 26 of the adhesive 30 may be made as sloping surfaces inclined relative to the substrate 13. The upper surfaces 22a of the pillars 22 are inclined to allow the adhesive 30 to flow toward the lateral surfaces 22b, thereby increasing the area to which the adhesive 30 is applied. In this case, the upper surface 22a is made to incline toward the pillar 22 adjacent thereto to allow the adhesive 30 to flow between the pillars 22 adjacent thereto, thereby increasing adhesive strength.

The pillars 22 may integrally be formed with reinforcing ribs formed continuously with a cylindrical fitting wall 23 to which the image pickup lens 11 is fitted. The strength of the lower half 16 of the camera device 1 can be increased by providing the reinforcing ribs on the pillars 22.

If the camera device 1 according to the embodiment of the present invention is used as an on-board camera, it may be attached to e.g. a front grille to reflect the front field of view as well as to the general center of the back door 2 of the automobile. If the camera device 1 is mounted to the front grille, the back door and both side mirrors so as to face the downside, the full periphery of the automobile can be viewed.

The camera device 1 not only can be used as an on-board camera but can be applied to e.g. a security camera and an intercom camera. Also in this case, the housing 10 can be downsized along with the downsizing of the substrate 13 so as to widely deal with any installation requirements.

The present application contains subject matter related to that disclosed in Japanese Priority Patent Application JP 2008-143274 filed in the Japan Patent Office on May 30, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. A camera device comprising:
   an image pickup element;
   a substrate mounted with the image pickup element thereon; and
   a housing accommodating the image pickup element therein, wherein
   the housing is provided with a plurality of support members which are provided along a lateral wall of the housing to extend upright and to which an external edge portion of the substrate is stuck with an adhesive,
   the substrate is provided with an application area to which the adhesive is applied, at the external edge portion stuck with the support members, and
   the support members are each formed to have a width of about 60% of a thickness of the lateral wall.

2. The camera device according to claim 1,
   wherein the substrate is formed with the application area at a plurality of separate portions of a planar surface of the substrate on which the image pickup element is mounted on opposite sides of the image pickup element and the housing is provided with the support members extending upright along a pair of opposite lateral walls.

3. The camera device according to claim 1,
   wherein the substrate is placed such that the portion of a planar surface of the substrate on which the image pickup element is mounted traverses upper surfaces of the support members.

* * * * *